United States Patent
Lanante et al.

(10) Patent No.: US 10,939,465 B2
(45) Date of Patent: Mar. 2, 2021

(54) WIRELESS COMMUNICATION SYSTEM, ACCESS POINT, TERMINAL, AND COMMUNICATION METHOD

(71) Applicant: NEC CORPORATION, Tokyo (JP)

(72) Inventors: Leonardo Lanante, Fukuoka (JP); Yuhei Nagao, Fukuoka (JP); Hiroshi Ochi, Fukuoka (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/477,568

(22) PCT Filed: Jan. 11, 2018

(86) PCT No.: PCT/JP2018/000427
§ 371 (c)(1),
(2) Date: Jul. 12, 2019

(87) PCT Pub. No.: WO2018/131632
PCT Pub. Date: Jul. 19, 2018

(65) Prior Publication Data
US 2020/0008237 A1    Jan. 2, 2020

(30) Foreign Application Priority Data
Jan. 13, 2017 (JP) .............................. JP2017-004666

(51) Int. Cl.
*H04W 74/00* (2009.01)
*H04W 52/24* (2009.01)
*H04W 84/12* (2009.01)

(52) U.S. Cl.
CPC ....... *H04W 74/006* (2013.01); *H04W 52/243* (2013.01); *H04W 84/12* (2013.01)

(58) Field of Classification Search
CPC . H04W 16/14; H04W 72/0446; H04W 74/02; H04W 74/006; H04W 74/0808;
(Continued)

(56) References Cited

U.S. PATENT DOCUMENTS

2017/0105217 A1* 4/2017 Kwon .................. H04W 52/245
2017/0142659 A1* 5/2017 Noh .................... H04W 52/0245
(Continued)

FOREIGN PATENT DOCUMENTS

CN    102595623 A    7/2012
CN    104937894 A    9/2015

OTHER PUBLICATIONS

Robert Stacey, "Specification Framework for TGax", IEEE 802.11-15/0132r17, IEEE, May 25, 2016, 61 pages, https://mentor.ieee.org/802.11/dcn/15/11-15-0132-17-00ax-spec-framework.docx>. Applicant notes that the copy of this document being filed is labeled as "IEEE 802.11-15/0132r15," however, the correct document number is "IEEE 802.11-15/0132r17."
(Continued)

*Primary Examiner* — Kan Yuen
(74) *Attorney, Agent, or Firm* — Sughrue Mion, PLLC

(57) ABSTRACT

A wireless communication system according to the present disclosure includes an access point (AP) belonging to a certain BSS and a terminal (STA) belonging to the AP. The STA updates an NAV used for virtual carrier sense according to whether the AP and the STA are permitted to use OBSS_PD-based SR.

6 Claims, 9 Drawing Sheets

(58) Field of Classification Search
CPC ......... H04W 74/0816; H04W 74/0825; H04W 74/0841; H04W 74/085; H04W 88/08
See application file for complete search history.

(56) References Cited

U.S. PATENT DOCUMENTS

| | | | | |
|---|---|---|---|---|
| 2018/0014327 A1* | 1/2018 | Park | ...................... | H04L 69/323 |
| 2018/0084584 A1* | 3/2018 | Umehara | .......... | H04W 74/0816 |
| 2018/0242362 A1* | 8/2018 | Kim | ..................... | H04W 24/10 |
| 2018/0324855 A1* | 11/2018 | Huang | .............. | H04W 74/0816 |
| 2018/0324859 A1* | 11/2018 | Kim | .................. | H04W 74/0816 |

OTHER PUBLICATIONS

James Wang et al., "Adjustment Rules for Adaptive CCA and TPC", IEEE 802.11-16/0414r1, IEEE, Mar. 13, 2016, 15 pages.
Kaushik Josiam et al., "TGax-MU-ad-hoc-November-2015-Agenda", IEEE 802.11-15/1418r2, IEEE, Nov. 11, 2018, 30 pages, <URL:https://mentor.ieee.org/802.11/dcn/15/11-15-1418-02-00ax-tgax-mu-ad-hocnovember-2015-agenda.pptx>.
Geonjung Ko et al., "Issues on BSS Color Bits Collision", IEEE 802.11-16/0396r0, IEEE, Mar. 14, 2016, 19 pages, <URL:https://mentor.ieee.org/802.11/dcn/16/11-16-0396-00-00ax-issues-on-bss-colorbits-collision.pptx>.
Written Opinion for PCT/JP2018/000427, dated Mar. 6, 2018.
International Search Report for PCT/JP2018/000427, dated Mar. 6, 2018.
Communication dated Nov. 12, 2019, from the European Patent Office in counterpart European Application No. 18739251.9.
Laurent Cariou (INTEL), et al., "CR for OBSS_PD-based spatial reuse-25.9.2", IEE 802.11-16/1223r2, Sep. 9, 2016, vol. 802.11ax, No. 2, pp. 1-6 (6 pages total).
U.S. Appl. No. 16/507,673, filed Jul. 10, 2019.
Communication dated Mar. 4, 2020 from the China National Intellectual Property Administration in Application No. 201880006605.8.

* cited by examiner

--RELATED ART--

WIRELESS COMMUNICATION SYSTEM, ACCESS POINT, TERMINAL, AND COMMUNICATION METHOD

CROSS REFERENCE TO RELATED APPLICATIONS

This application is a National Stage of International Application No. PCT/JP2018/000427 filed Jan. 11, 2018, claiming priority based on Japanese Patent Application No. 2017-004666 filed Jan. 13, 2017, the disclosure of which is incorporated herein in its entirety by reference.

TECHNICAL FIELD

The present disclosure relates to a wireless communication system, an access point, a terminal, and a communication method.

BACKGROUND ART

In wireless Local Area Network (LAN) standards Institute of Electrical and Electronics Engineers (IEEE) 802.11, a task group TGax has been studying a next-generation communication system IEEE 802.11ax (HEW: High Efficiency Wireless LAN (WLAN)). Regarding component technologies, it is expected that IEEE 802.11ax will employ a new modulation/demodulation system (1024 Quadrature Amplitude Modulation (QAM)), support uplink Multi User Multi-Input Multi-Output (MU-MIMO), introduce Orthogonal Frequency-Division Multiple Access (OFDMA), and so on.

Incidentally, with respect to a predetermined Basic Service Set (BSS), another BSS of which the area overlaps with the area of the predetermined BSS and which uses the same frequency as that of the predetermined BSS is referred to as an Overlapping BSS (OBSS). Further, a state where a plurality of BSSs coexist as OBSSs with respect to each other is referred to as an OBSS problem (or an OBSS environment). The OBSS problem frequently occurs in a Dense deployment environment having a high deployment density of access points. Further, the Dense deployment environment greatly reduces throughputs of both a terminal and an access point due to interference of the OBSS.

FIG. 1 shows a configuration example of a wireless communication system in which the OBSS problem is occurring. The area of a BSS 1 overlaps with the area of a BSS 2 and the BSS1 uses the same frequency as that of the BSS 2. Accordingly, the BSS 2 is an OBSS with respect to the BSS 1, while the BSS 1 is an OBSS with respect to the BSS 2.

The nodes belonging to the BSS 1 include an access point AP1 forming the BSS 1 and terminals STA1-1 and STA1-2 associated with the access point AP1. The terminal STA1-1 is located in the area where the BSS 1 and the BSS 2 overlap. This causes communication between the access point AP1 and the terminal STA1-1 to receive interference from the BSS 2, thereby reducing throughputs of the access point AP1 and the terminal STA1-1.

The nodes belonging to the BSS 2 include an access point AP2 forming the BSS 2 and terminals STA2-1 and STA2-2 associated with the access point AP2. The terminal STA2-1 is located in the area where the BSS 1 and the BSS 2 overlap. This causes communication between the access point AP2 and the terminal STA2-1 to receive interference from the BSS 1, thereby reducing throughputs of the access point AP2 and the terminal STA2-1.

Note that the above configuration is not limited to being a configuration in which two terminals STA1-1 and STA1-2 belong to the BSS 1, and it is only required that at least one terminal belong thereto. Hereinafter, a terminal belonging to the BSS 1 is referred to as a terminal STA1 when it is not necessary to specify a terminal. Further, the above configuration is not limited to being a configuration in which two terminals STA2-1 and STA2-2 belong to the BSS 2, and it is only required that at least one terminal belong thereto. Hereinafter, a terminal belonging to the BSS 2 is referred to as a terminal STA2 when it is not necessary to specify a terminal. Further, hereinafter, when it is not specified whether a terminal is a terminal STA1 or a terminal STA2, it is referred to as a terminal STA, and when it is not specified whether an access point is an access point AP1 or an access point AP2, it is referred to as an access point AP.

It is expected that IEEE 802.11ax (HEW) will add a function of Spatial Reuse (SR; reuse of space/reuse of frequency) to improve throughput of the access point AP in the Dense deployment environment. Two mechanisms of OBSS_Power Detect (PD)-based SR and Two Network Allocation Vectors (NAVs) related to SR are described hereinafter.

First, the OBSS_PD-based SR is described.

The OBSS_PD-based SR has a function in which the access point AP and the terminal STA perform adjustment so as to avoid interference between the BSS and the OBSS by dynamically adjusting transmission power (TXPWR) and a Clear Channel Assessment (CCA) sensitivity level (e.g., see Non-Patent Literature 1). This function contributes to solving the OBSS problem. However, a specific algorithm for determining the TXPWR and the CCA sensitivity level is implementation-dependent.

Next, the Two NAVs are described.

IEEE 802.11ax (HEW) introduces a mechanism in which the terminal STA determines whether the radio frame (e.g., a Physical Layer Convergence Protocol (PLCP) Protocol Data Unit (PPDU) frame) received on the channel is a radio frame (an Intra-BSS frame) received from the BSS to which it belongs or a radio frame (an Inter-BSS frame) received from the OBSS. This determination is made, for example, by checking a BSS color bit and Media Access Control (MAC) header of the received radio frame (e.g., see Non-Patent Literature 1). For example, in the example of FIG. 1, the terminal STA1-1 belonging to the BSS 1 determines that the radio frame received from the access point AP1 or the terminal STA1-2 that belongs to the same BSS 1 is an intra-BSS frame and that the radio frame received from the access point AP2 or the terminals STA2-1 and STA2-2 that belong to the BSS 2 serving as the OBSS is an Inter-BSS frame.

Further, IEEE 802.11ax (HEW) expands a Virtual Carrier Sense function using in IEEE 802.11. An existing NAV used in the virtual carrier sense of Distributed Coordination Function (DCF) communication is referred to as a Conventional NAV. The Conventional NAV is the one for setting a transmission prohibition period to the terminal STA by signaling. During a period in which the Conventional NAV>0, the terminal STA determines, without performing physical carrier sense, the medium in use to be BUSY (virtual carrier sense) and does not transmit any radio frame. Thus, the Conventional NAV contributes to reducing power of the terminal STA and improving communication efficiency (i.e., contributes to overcoming the so-called hidden terminal problem).

IEEE 802.11ax (HEW) defines new Two NAVs referred to as an Intra-BSS NAV and a Basic NAV in addition to the Conventional NAV (e.g., see Non-Patent Literature 1).

The Intra-BSS NAV is updated based on a NAV value included in the received Intra-BSS frame.

When a reception level of the received radio frame exceeds a threshold OBSS_PD and the received radio frame is determined to be an Inter-BSS frame, or when the received radio frame cannot be determined to be an Intra-BSS frame, the Basic NAV is updated based on a NAV value included in the received radio frame. Note that the OBSS_PD is a threshold which varies in accordance with transmission power TXPWR (e.g., see Non-Patent Literature 2).

During a period in which the Intra-BSS NAV>0 or the Basic NAV>0, the terminal STA compatible with IEEE 802.11ax determines, without performing the physical carrier sense, the medium to be BUSY and does not transmit any radio frame (virtual carrier sense).

By the above-described operations of the Two NAVs, the terminal STA compatible with IEEE 802.11ax does not consider the medium in use to be BUSY when a reception level of the Inter-BSS frame received from the OBSS is the threshold OBSS_PD or less. This enables the terminal STA compatible with IEEE 802.11ax to continue Intra-BSS communication within the BSS to which it belongs, thereby preventing a decrease in throughput in the OBSS environment.

CITATION LIST

Non-Patent Literature

Non-Patent Literature 1: IEEE 802.11-15/0132r17
Non-Patent Literature 2: IEEE 802.11-16/0414r1

SUMMARY OF INVENTION

Technical Problem

Incidentally, the setting of the OBSS_PD-based SR depends on the implementation by the manufacturer of the terminal STA and the access point AP. Accordingly, in some cases, the OBSS_PD-based SR and the Two NAVs may be used in combination. However, using the OBSS_PD-based SR and the Two NAVs in combination causes a problem that a behavior of the entire wireless communication system becomes very complicated.

It is therefore one of the objects of the present disclosure to provide a wireless communication system, an access point, a terminal and a communication method capable of solving the above-described problem and preventing a behavior of an entire wireless communication system from being very complicated.

Solution to Problem

In one aspect, a wireless communication system including an access point (AP) that belongs to a certain Basic Service Set (BSS) and a terminal (STA) that belongs to the AP, in which
the STA updates a Network Allocation Vector (NAV) used for virtual carrier sense according to whether the AP and the STA are permitted to use Overlapping BSS (OBSS)_Power Detect (PD)-based Spatial Reuse (SR) that includes a function of performing adjustment so as to avoid interference between the BSS and the OBSS.

In one aspect, an access point is an access point (AP) in a wireless communication system, the wireless communication system including the AP that belongs to a certain Basic Service Set (BSS) and a terminal (STA) that belongs to the AP,
the AP including:
a memory configured to store instructions; and
at least one processor configured to process the instructions, in which
the processor instructs the STA to update a Network Allocation Vector (NAV) used for virtual carrier sense according to whether the AP and the STA are permitted to use Overlapping BSS (OBSS)_Power Detect (PD)-based Spatial Reuse (SR) that includes a function of performing adjustment so as to avoid interference between the BSS and the OBSS.

In one aspect, a terminal is a terminal (STA) in a wireless communication system, the wireless communication system including an access point (AP) that belongs to a certain Basic Service Set (BSS) and the STA that belongs to the AP,
the STA including:
a memory configured to store instructions; and
at least one processor configured to process the instructions, in which
the processer updates a Network Allocation Vector (NAV) used for virtual carrier sense according to whether the AP and the STA are permitted to use Overlapping BSS (OBSS)_Power Detect (PD)-based Spatial Reuse (SR) that includes a function of performing adjustment so as to avoid interference between the BSS and the OBSS.

In one aspect, a communication method is a communication method performed by an access point (AP) in a wireless communication system, the wireless communication system including the AP that belongs to a certain Basic Service Set (BSS) and a terminal (STA) that belongs to the AP,
the communication method including instructing the STA to update a Network Allocation Vector (NAV) used for virtual carrier sense according to whether the AP and the STA are permitted to use Overlapping BSS (OBSS)_Power Detect (PD)-based Spatial Reuse (SR) that includes a function of performing adjustment so as to avoid interference between the BSS and the OBSS.

In another aspect, a communication method is a communication method performed by a terminal (STA) in a wireless communication system, the wireless communication system including an access point (AP) that belongs to a certain Basic Service Set (BSS) and the STA that belongs to the AP,
the communication method including updating a Network Allocation Vector (NAV) used for virtual carrier sense according to whether the AP and the STA are permitted to use Overlapping BSS (OBSS)_Power Detect (PD)-based Spatial Reuse (SR) that includes a function of performing adjustment so as to avoid interference between the BSS and the OBSS.

Advantageous Effects of Invention

The above-described aspects can achieve an effect of preventing a behavior of an entire wireless communication system from being very complicated.

DESCRIPTION OF EMBODIMENTS

Figure 1:
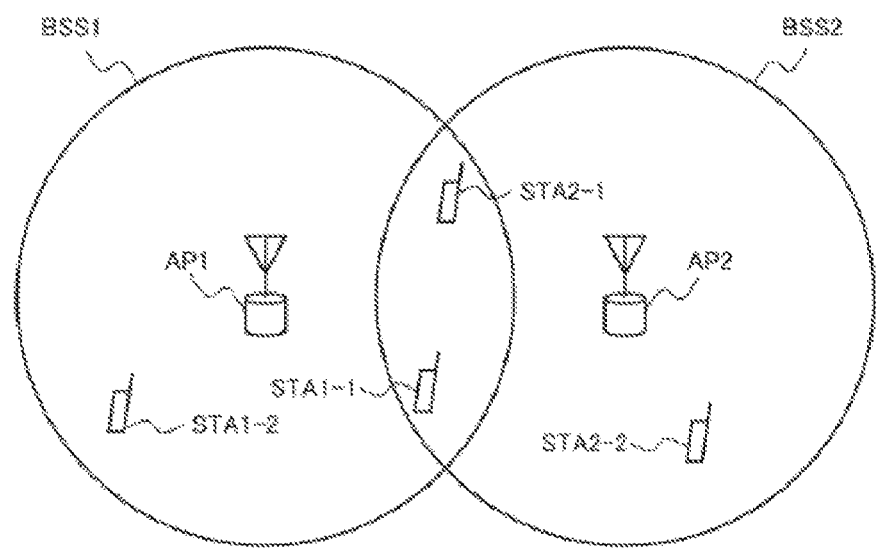
FIG. 1 shows a configuration example of a wireless communication system in which an OBSS problem is occurring.

Example embodiments of the present disclosure will be described hereinafter with reference to the drawings. A configuration of a wireless communication system according to each example embodiment described below is the same as the one shown in FIG. 1, and includes access points AP and terminals STA.

The terminals STA are roughly classified as being either a terminal STA compatible with IEEE 802.11ax or a terminal STA incompatible with IEEE 802.11ax.

The terminal STA compatible with IEEE 802.11ax holds three NAVs inside thereof, which are a Conventional NAV and Two NAVs (an Intra-BSS NAV and a Basic NAV), and uses at least one of the three NAVs to perform the virtual carrier sense. Note that the terminal STA compatible IEEE 802.11ax may handle the Conventional NAV and the Basic NAV in a unified manner. In such a case, the terminal STA compatible with IEEE 802.11ax holds the Basic NAV (this Basic NAV is equated with the Conventional NAV) and the Intra-BSS NAV inside thereof. Further, the OBSS_PD-based SR can be set to the terminal STA compatible with IEEE 802.11ax.

On the other hand, the terminal STA incompatible with IEEE 802.11ax holds only the Conventional NAV inside thereof and performs the virtual carrier sense using the Conventional NAV. Further, the OBSS_PD-based SR cannot be set to the terminal STA incompatible with IEEE 802.11ax.

(1) First Example Embodiment

IEEE 802.11ax (HEW) adds two mechanisms which are the OBSS_PD-based SR and the Two NAVs. In a wireless communication system, however, using the OBSS_PD-based SR and the Two NAVs in combination causes a problem that a behavior of the entire wireless communication system becomes very complicated.

In the first example embodiment, therefore, in a predetermined BSS, the NAV which the terminal STA compatible with IEEE 802.11ax uses for the virtual carrier sense is adaptively switched according to whether settings of the OBSS_PD-based SR in the access point AP and the terminal STA compatible with IEEE 802.11ax that belong to that BSS is set to on (in other words, whether the OBSS_PD-based SR is enabled. The same applies hereinafter.).

Specifically, the wireless communication system according to the first example embodiment includes modes 0, 1, 2, and 3 as operation modes of the virtual carrier sense, and switches the NAV which the terminal STA compatible with IEEE 802.11ax uses for the virtual carrier sense by switching between the modes 0, 1, 2, and 3. The modes 0, 1, 2, and 3 are described hereinafter. In the modes 0, 1, 2, and 3, as terminals STAs belonging to the BSS, both the terminal STA compatible with IEEE 802.11ax and the terminal STA incompatible with IEEE 802.11ax may be present or only the terminals STAs compatible with IEEE 802.11ax may be present. Note that an operation in the BSS 1 will be described hereinafter as an example and the same applies to an operation in the BSS 2.

Mode 0:

A mode 0 is a mode similar to that of related art using OBSS_PD-based SR and two NAVs in combination.

The mode 0 is performed under the environment where settings of the OBSS_PD-based SR in the access point AP1 and the terminal STA1 compatible with IEEE 802.11ax that belong to the BSS 1 is set to on.

In the mode 0, the terminal STA1 compatible with IEEE 802.11ax uses the Conventional NAV and the two NAVs (the Intra-BSS NAV and the Basic NAV) to perform virtual carrier sense, and the terminal STA1 incompatible with IEEE 802.11ax uses the Conventional NAV to perform the virtual carrier sense.

The following Table 1 shows a summary of the mode 0.

TABLE 1

| | |
|---|---|
| Terminal STA compatible with IEEE 802.11ax | o(present) |
| Terminal STA incompatible with IEEE 802.11ax | o(present) or x(not present) |
| OBSS_PD-based SR | o(set) |
| Conventional NAV | o(used) |
| Intra-BSS NAV | o(used) |
| Basic NAV | o(used) |

Mode 1:

A mode 1 is performed under the environment where settings of the OBSS_PD-based SR in the access point AP1 and the terminal STA1 compatible with IEEE 802.11ax that belong to the BSS 1 is set to on.

In the mode 1, the terminal STA1 compatible with IEEE 802.11ax and the terminal STA1 incompatible with IEEE 802.11ax both use only the Conventional NAV to perform the virtual carrier sense.

The following Table 2 shows a summary of the mode 1.

TABLE 2

| | |
|---|---|
| Terminal STA compatible with IEEE 802.11ax | o(present) |
| Terminal STA incompatible with IEEE 802.11ax | o(present) or x(not present) |
| OBSS_PD-based SR | o(set) |
| Conventional NAV | o(used) |
| Intra-BSS NAV | x(unused) |
| Basic NAV | x(unused) |

Mode 2:

A mode 2 is performed under the environment where settings of the OBSS_PD-based SR in the access point AP1 and the terminal STA1 compatible with the IEEE 802.11ax that belong to the BSS 1 is set to off (in other words, the OBSS_PD-based SR is prohibited. The same applies hereinafter).

In the mode 2, the terminal STA1 compatible with IEEE 802.11ax and the terminal STA1 incompatible with IEEE 802.11ax both use only the Conventional NAV to perform the virtual carrier sense.

The following Table 3 shows a summary of the mode 2.

TABLE 3

| | |
|---|---|
| Terminal STA compatible with IEEE 802.11ax | ○(present) |
| Terminal STA incompatible with IEEE 802.11ax | ○(present) or x(not present) |
| OBSS_PD-based SR | x(not set) |
| Conventional NAV | ○(used) |
| Intra-BSS NAV | x(unused) |
| Basic NAV | x(unused) |

Mode 3:

A mode 3 is performed under the environment where settings of the OBSS_PD-based SR in the access point AP1 and the terminal STA1 compatible with the IEEE 802.11ax that belong to the BSS 1 is set to off.

In the mode 3, the terminal STA1 compatible with IEEE 802.11ax uses the Conventional NAV, the Intra-BSS NAV and the Basic NAV to perform the virtual carrier sense. The terminal STA1 compatible with IEEE 802.11ax determines, upon receiving a radio frame (e.g., a PPDU frame, a Request To Send (RTS)/Clear To send (CTS) frame) including a NAV value, whether the received radio frame is an Intra-BSS frame received from the BSS 1 to which it belongs or an Inter-BSS frame received from the BSS 2 serving as the OBSS. When the terminal STA1 compatible with IEEE 802.11ax determines the received radio frame to be an Intra-BSS frame, it updates the Conventional NAV and the Intra-BSS NAV based on the NAV value included in the Intra-BSS frame. When the terminal STA1 compatible with IEEE 802.11ax determines the received radio frame to be an Inter-BSS, it updates the Conventional NAV and the Basic NAV based on the NAV value included in the Inter-BSS frame.

On the other hand, the terminal STA1 incompatible with IEEE 802.11ax uses only the Conventional NAV to perform the virtual carrier sense.

The following Table 4 shows a summary of the mode 3.

TABLE 4

| | |
|---|---|
| Terminal STA compatible with IEEE 802.11ax | ○(present) |
| Terminal STA incompatible with IEEE 802.11ax | ○(present) or x(not present) |
| OBSS_PD-based SR | x(not set) |
| Conventional NAV | ○(used) |
| Intra-BSS NAV | ○(used) |
| Basic NAV | ○(used) |

Figure 2:
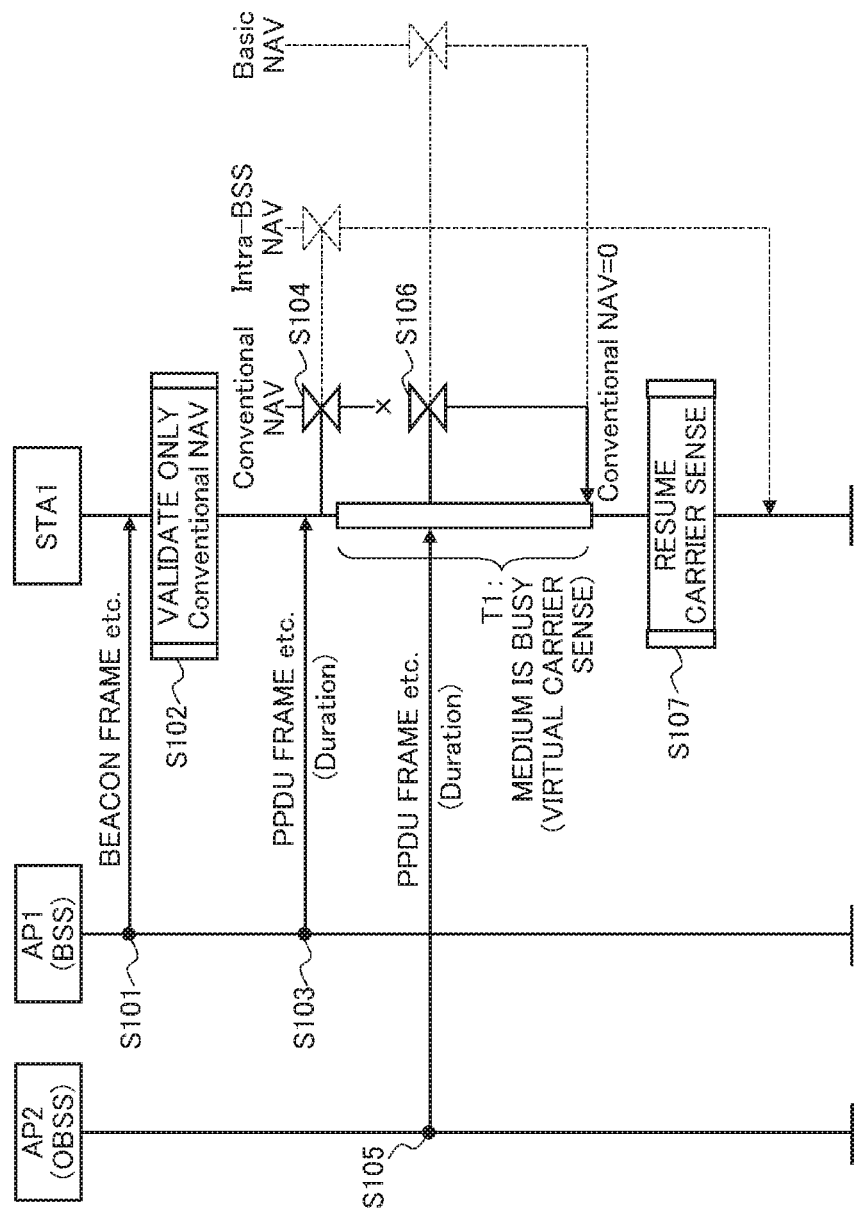
FIG. 2 is a sequence diagram for explaining a mode 1 in a wireless communication system according to a first example embodiment.

Next, a specific example for achieving the mode 1 is described with reference to FIG. 2.

First, the access point AP1 belonging to the BSS 1 transmits, to all the terminals STA1 compatible with the IEEE 802.11ax belonging to the BSS 1, signaling which instructs them to invalidate the Intra-BSS NAV and the Basic NAV other than the Conventional NAV (Step S101). The access point AP1 includes this signaling, for example, in a radio frame such as a beacon frame and transmits it.

When the terminal STA1 compatible with IEEE 802.11ax receives that signaling from the access point AP1, it invalidates the Intra-BSS NAV and the Basic NAV other than the Conventional NAV. Note that it is assumed that there are two forms of invalidating the NAV: one in which the NAV is disabled and another one in which a Special Value such as 0 is set (fixed) to the NAV (The same applies hereinafter). Consequently, only the Conventional NAV is validated (Step S102). After that, the terminal STA1 compatible with IEEE 802.11ax therefore uses only the Conventional NAV to perform the virtual carrier sense.

When the terminal STA1 compatible with IEEE 802.11ax receives a radio frame such as a PPDU frame and an RTS/CTS frame from the access point AP1 of the BSS 1 to which it belongs (Step S103), it updates the Conventional NAV based on the NAV value included in the received radio frame (Step S104). After that, the terminal STA1 compatible with IEEE 802.11ax does not perform the physical carrier sense in a period T1 in which the Conventional NAV>0, considers the medium in use to be BUSY (virtual carrier sense), and does not transmit a radio frame.

Further, when the terminal STA1 compatible with IEEE 802.11ax receives a radio frame such as a PPDU frame and an RTS/CTS frame from the access point AP2 which belongs to the BSS 2 serving as the OBSS in the same medium as the above one (Step S105), it updates the Conventional NAV based on the NAV value included in the received radio frame (Step S106).

Then, when the Conventional NAV=0, the terminal STA1 compatible with IEEE 802.11ax resumes the physical carrier sense (Step S107).

Note that the terminal STA1 incompatible with IEEE 802.11ax does not hold the Two NAVs and accordingly uses the Conventional NAV to perform the virtual carrier sense. This operation is the same as that of related art and the explanation thereof is thus omitted.

Figure 3:
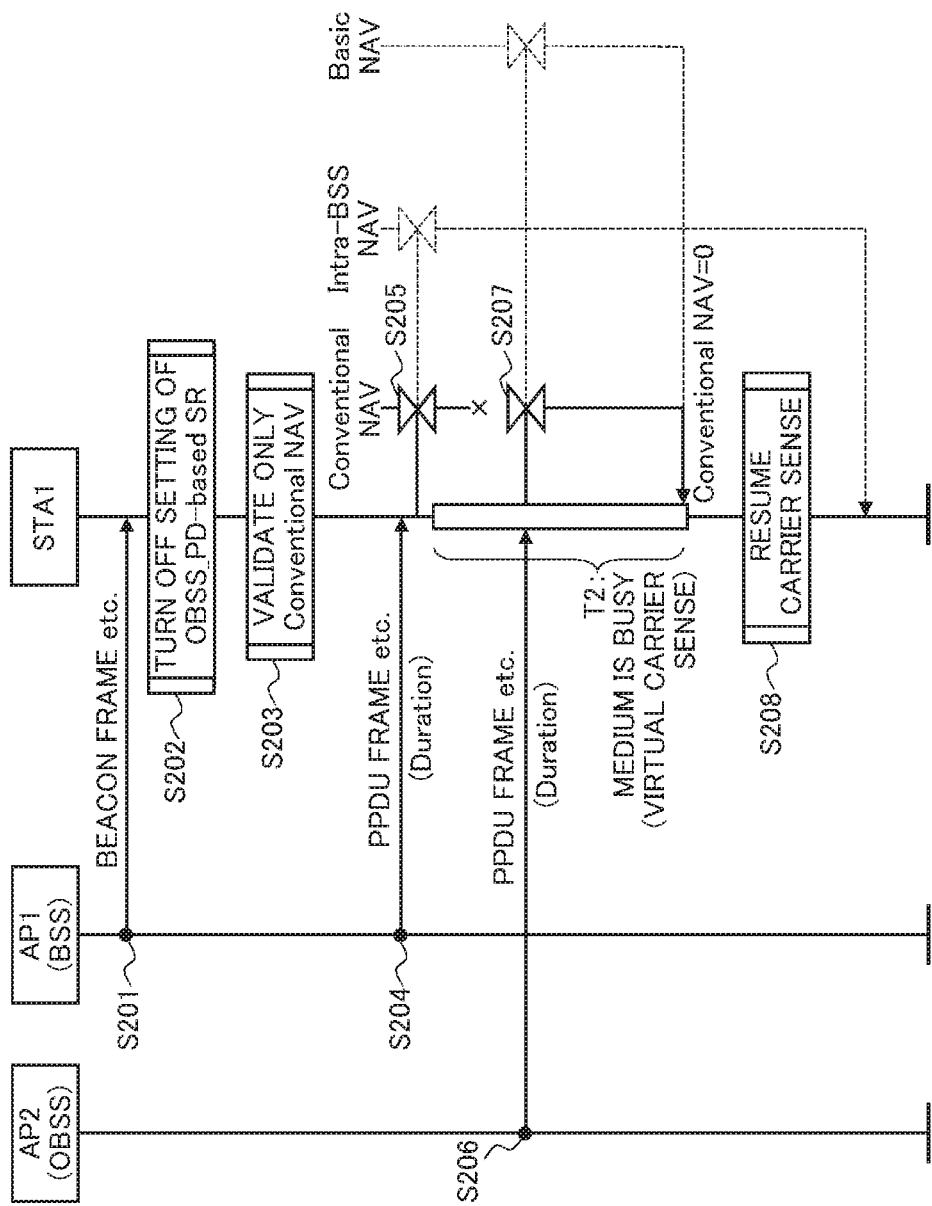
FIG. 3 is a sequence diagram for explaining a mode 2 in the wireless communication system according to the first example embodiment.

Next, a specific example for achieving the mode 2 is described with reference to FIG. 3.

First, the access point AP1 belonging to the BSS 1 transmits, to all the terminals STA1 compatible with the IEEE 802.11ax belonging to the BSS 1, signaling which instructs them to turn off the setting of the OBSS_PD based SR and to invalidate the Intra-BSS NAV and the Basic NAV other than the Conventional NAV (Step S201). The access point AP1 includes this signaling, for example, in an HE operation element or a capability element of a radio frame such as a beacon frame and transmits it.

When the terminal STA1 compatible with IEEE 802.11ax receives that signaling from the access point AP1, it turns off the setting of the OBSS_PD based SR (Step S202). Further, the terminal STA1 compatible with IEEE 802.11ax invalidates the Intra-BSS NAV and the Basic NAV other than the Conventional NAV. Consequently, only the Conventional NAV is validated (Step S203). After that, the terminal STA1 compatible with IEEE 802.11ax therefore uses only the Conventional NAV to perform the virtual carrier sense.

When the terminal STA1 compatible with IEEE 802.11ax receives a radio frame such as a PPDU frame and an RTS/CTS frame from the access point AP1 of the BSS 1 to which it belongs (Step S204), it updates the Conventional NAV based on the NAV value included in the received radio frame (Step S205). After that, the terminal STA1 compatible with IEEE 802.11ax does not perform physical carrier sense in a period T2 in which the Conventional NAV>0, considers the medium in use to be BUSY (virtual carrier sense), and does not transmit a radio frame.

Further, when the terminal STA1 compatible with IEEE 802.11ax receives a radio frame such as a PPDU frame and an RTS/CTS frame from the access point AP2 which belongs to the BSS 2 serving as the OBSS in the same medium as the above one (Step S206), it updates the Conventional NAV based on the NAV value included in the received radio frame (Step S207).

Then, when the Conventional NAV=0, the terminal STA1 compatible with IEEE 802.11ax resumes the physical carrier sense (Step S208).

Note that the terminal STA1 incompatible with IEEE 802.11ax does not hold the Two NAVs and accordingly uses the Conventional NAV to perform the virtual carrier sense. This operation is the same as that of related art and the explanation thereof is thus omitted.

Figure 4:
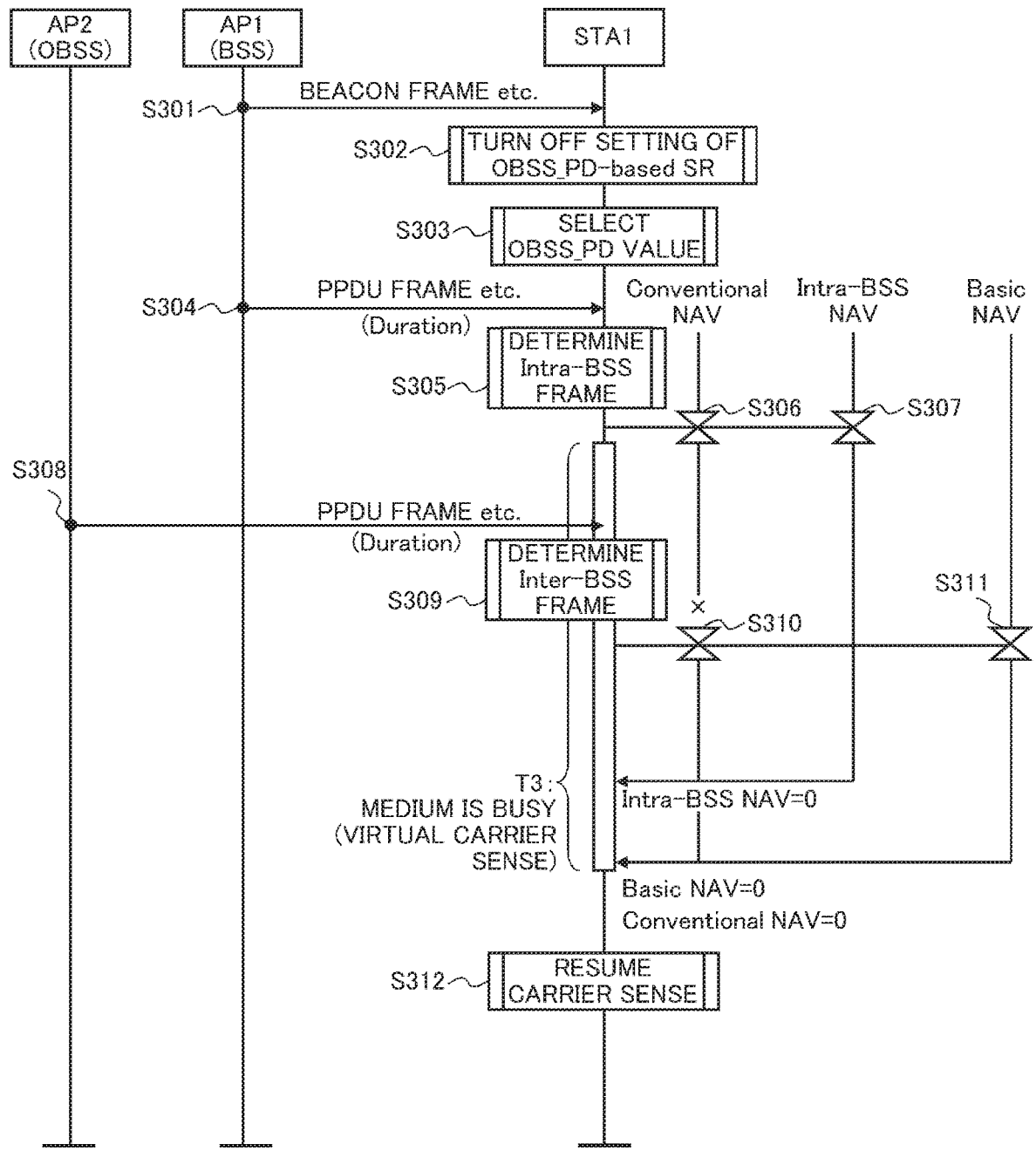
FIG. 4 is a sequence diagram for explaining a mode 3 in the wireless communication system according to the first example embodiment.

Next, a specific example for achieving the mode 3 is described with reference to FIG. 4.

First, the access point AP1 belonging to the BSS 1 transmits, to all the terminals STA1 compatible with the IEEE 802.11ax belonging to the BSS 1, signaling which instructs them to turn off the setting of the OBSS_PD based SR (Step S301). The access point AP1 includes this signaling, for example, in an HE operation element or a capability element of a radio frame such as a beacon frame and transmits this.

When the terminal STA1 compatible with IEEE 802.11ax receives that signaling from the access point AP1, it turns off the setting of the OBSS_PD based SR (Step S302). Further, the terminal STA1 compatible with IEEE 802.11ax randomly selects an OBSS_PD value for determining whether the received radio frame is an Intra-BSS frame or an Inter-BSS frame (Step S303). As for the OBSS_PD value, for example, a default value (e.g., OBSS_PDmin) or OBSS_PDmin notified in advance from the access point AP1 may be selected.

In this case, the Conventional NAV, the Intra-BSS NAV, and the Basic NAV all remain validated. After that, the terminal STA1 compatible with IEEE 802.11ax therefore uses the Conventional NAV, the Intra-BSS NAV and the Basic NAV to perform the virtual carrier sense.

When the terminal STA1 compatible with IEEE 802.11ax receives a radio frame such as a PPDU frame and an RTS/CTS frame from the access point AP1 of the BSS 1 to which it belongs (Step S304), it determines whether the received radio frame is an Intra-BSS frame or an Inter-BSS frame, for example, by comparing a reception level of the received radio frame with the OBSS_PD value (Step S305).

Note that the radio frame received in Step S304 is an Intra-BSS frame and accordingly the terminal STA1 compatible with IEEE 802.11ax updates the Conventional NAV and the Intra-BSS NAV based on the NAV value included in the Intra-BSS frame (Steps S306 and S307). On the other hand, it does not update the Inter-BSS NAV. After that, in a period T3 in which one of the Conventional NAV, the Intra-BSS NAV and the Basic NAV indicates a value greater than 0, the terminal STA1 compatible with IEEE 802.11ax does not perform physical carrier sense, considers the medium in use to be BUSY (virtual carrier sense), and does not transmit a radio frame.

Further, when the terminal STA1 compatible with IEEE 802.11ax receives a radio frame such as a PPDU frame and an RTS/CTS frame from the access point AP2 which belongs to the BSS 2 serving as the OBSS in the same medium (Step S308), it determines whether the received radio frame is an Intra-BSS frame or an Inter-BSS frame, for example, by comparing a reception level of the received radio frame with the OBSS_PD value (Step S309).

Note that the radio frame received in Step S308 is an Inter-BSS frame and accordingly the terminal STA1 compatible with IEEE 802.11ax updates the Conventional NAV and the Basic NAV based on the NAV value included in the Inter-BSS frame (Steps S310 and S311). On the other hand, it does not update the Intra-BSS NAV. Performing the virtual carrier sense is continued during a period in which the Conventional NAV or the Basic NAV indicates a value greater than 0 even when the Intra-BSS NAV=0.

Then, when all the Conventional NAV, the Intra-BSS NAV and the Basic NAV are 0, the terminal STA1 compatible with IEEE 802.11ax resumes the physical carrier sense (Step S312).

According to the first example embodiment, as described above, the NAV which the terminal STA compatible with IEEE 802.11ax uses for the virtual carrier sense is switched according to whether settings of the OBSS_PD-based SR in the access point AP and the terminal STA compatible with IEEE 802.11ax that belong to the BSS is set to on.

This reduces the cases in which the OBSS_PD-based SR and the Two NAVs are used in combination and thus makes it possible to prevent a behavior of the entire wireless communication system from being very complicated. Further, this simplifies the behavior of the entire wireless communication system and thus makes it possible to achieve a stable communication state.

For example, under the environment where settings of the OBSS_PD-based SR in the access point AP1 and the terminal STA1 compatible with IEEE 802.11ax that belong to the BSS 1 is set to on, the mode 1 is performed. In the mode 1, the terminal STA1 compatible with IEEE 802.11ax uses only the Conventional NAV to perform the virtual carrier sense. Performing the mode 1 under such the environment prevents the terminal STA1 incompatible with IEEE 802.11ax from being at a disadvantage when both the terminal STA1 compatible with IEEE 802.11ax and the terminal STA1 incompatible with IEEE 802.11ax are present as the terminals STA1 belonging to the BSS 1. This is described hereinafter.

For example, it is assumed that the terminal STA1 compatible with IEEE 802.11ax uses the Basic NAV to perform the virtual carrier sense. When the terminal STA1 incompatible with IEEE 802.11ax receives a radio frame from the BSS 2 serving as the OBSS, it sets the Conventional NAV and enters a transmission prohibited period to prevent communication. On the other hand, when the terminal STA1 compatible with IEEE 802.11ax receives a radio frame from the BSS 2, there is a possibility that it may acquire a transmission opportunity (TXOP) without setting the basic NAV by a function of the OBSS_PD value and start communication within the BSS 1. In such a case, the radio frame transmitted from the terminal STA1 compatible with IEEE 802.11ax causes the terminal STA1 incompatible with IEEE 802.11ax to set new Conventional NAV, and consequently the terminal STA1 incompatible with IEEE 802.11ax cannot perform the Intra-BSS communication within the BSS 1 even when the interference from the BSS 2 is reduced. Therefore, the terminal STA1 incompatible with IEEE 802.11ax may be more disadvantageous than the terminal STA1 compatible with IEEE 802.11ax in view of throughput and communication efficiency. In the mode 1, however, not only the terminal STA1 incompatible with IEEE 802.11ax but also the terminal STA1 compatible with IEEE 802.11ax uses the Conventional NAV, thereby making it possible to prevent the terminal STA1 incompatible with IEEE 802.11ax from being disadvantageous.

(2) Second Example Embodiment

IEEE 802.11ax (HEW) adds two mechanisms which are the OBSS_PD-based SR and the Two NAVs. In a wireless communication system, however, using the OBSS_PD-based SR and the Two NAVs in combination causes a problem that a behavior of the entire wireless communication system becomes very complicated. Further, in a certain BSS, under the special environment where only the terminal STA compatible with IEEE 802.11ax is present as the terminal STA belonging to that BSS, the OBSS_PD-based SR can be set to all the terminals STA belonging to that BSS. Consequently, if the OBSS_PD-based SR functions appropriately, the number of occasions in which frames are received from the terminal STA or the access point AP that belong to the OBSS is reduced and the Intra-BSS communication within the BSS is less likely to interfere with the intra-BSS communication within the OBSS. The need for having the terminal STA use the Two NAVs is thus reduced.

In a second example embodiment, therefore, in a predetermined BSS, the NAV which the terminal STA compatible with IEEE 802.11ax uses for the virtual carrier sense is adaptively switched according to whether only the terminal STA compatible with IEEE 802.11ax is present as the terminal STA belonging to that BSS or both the terminal STA compatible with IEEE 802.11ax and the terminal STA incompatible with IEEE 802.11ax are present as the terminals STA belonging to that BSS under the environment where settings of the OBSS_PD-based SR in the access point AP and the terminal STA compatible with IEEE 802.11ax that belong to that BSS is set to on.

Specifically, the wireless communication system according to the second example embodiment includes modes 0' and 4 as operation modes of the virtual carrier sense and switches the NAV which the terminal STA compatible with IEEE 802.11ax uses for the virtual carrier sense by switching between the modes 0' and 4. The modes 0' and 4 are described hereinafter. Note that an operation in the BSS 1 will be described hereinafter as an example and the same applies to an operation in the BSS 2.

Mode 0':

A mode 0' is different from the mode 0 only in that it is limited to being performed under the environment where only the terminal STA1 compatible with IEEE 802.11ax is present as the terminal STA1 belonging to the BSS 1.

That is, the mode 0' is performed under the environment where only the terminal STA1 compatible with IEEE 802.11ax is present as the terminal STA1 belonging to the BSS 1 and where settings of the OBSS_PD-based SR in the access point AP1 and the terminal STA1 compatible with IEEE 802.11ax that belong to the BSS 1 is set to on.

In the mode 0', the terminal STA1 compatible with IEEE 802.11ax uses the Conventional NAV and the two NAVs (the Intra-BSS NAV and the Basic NAV) to perform the virtual carrier sense, and the terminal STA1 incompatible with IEEE 802.11ax uses the Conventional NAV to perform the virtual carrier sense.

The following Table 5 shows a summary of the mode 0'.

TABLE 5

| | |
|---|---|
| Terminal STA compatible with IEEE 802.11ax | ○(present) |
| Terminal STA incompatible with IEEE 802.11ax | x(not present) |
| OBSS_PD-based SR | ○(set) |
| Conventional NAV | ○(used) |

TABLE 5-continued

| | |
|---|---|
| Intra-BSS NAV | ○(used) |
| Basic NAV | ○(used) |

Mode 4:

A mode 4 is performed under the environment where only the terminal STA1 compatible with IEEE 802.11ax is present as the terminal STA1 belonging to the BSS 1 and where settings of the OBSS_PD-based SR in the access point AP1 and the terminal STA1 compatible with IEEE 802.11ax that belong to the BSS 1 is set to on.

In the mode 4, the terminal STA1 compatible with IEEE 802.11ax uses only the Intra-BSS NAV to perform the virtual carrier sense. The terminal STA1 compatible with IEEE 802.11ax determines, upon receiving a radio frame (e.g., a PPDU frame, an RTS/CTS frame) including a NAV value, whether the received radio frame is an Intra-BSS frame received from the BSS 1 to which it belongs or an Inter-BSS frame received from the BSS 2 serving as the OBSS. When the terminal STA1 compatible with IEEE 802.11ax determines the received radio frame to be an Intra-BSS frame, it updates the Intra-BSS NAV based on the NAV value included in the Intra-BSS frame.

The following Table 6 shows a summary of the mode 4.

TABLE 6

| | |
|---|---|
| Terminal STA compatible with IEEE 802.11ax | ○(present) |
| Terminal STA incompatible with IEEE 802.11ax | x(not present) |
| OBSS_PD-based SR | ○(set) |
| Conventional NAV | x(unused) |
| Intra-BSS NAV | ○(use) |
| Basic NAV | x(unused) |

Figure 5:
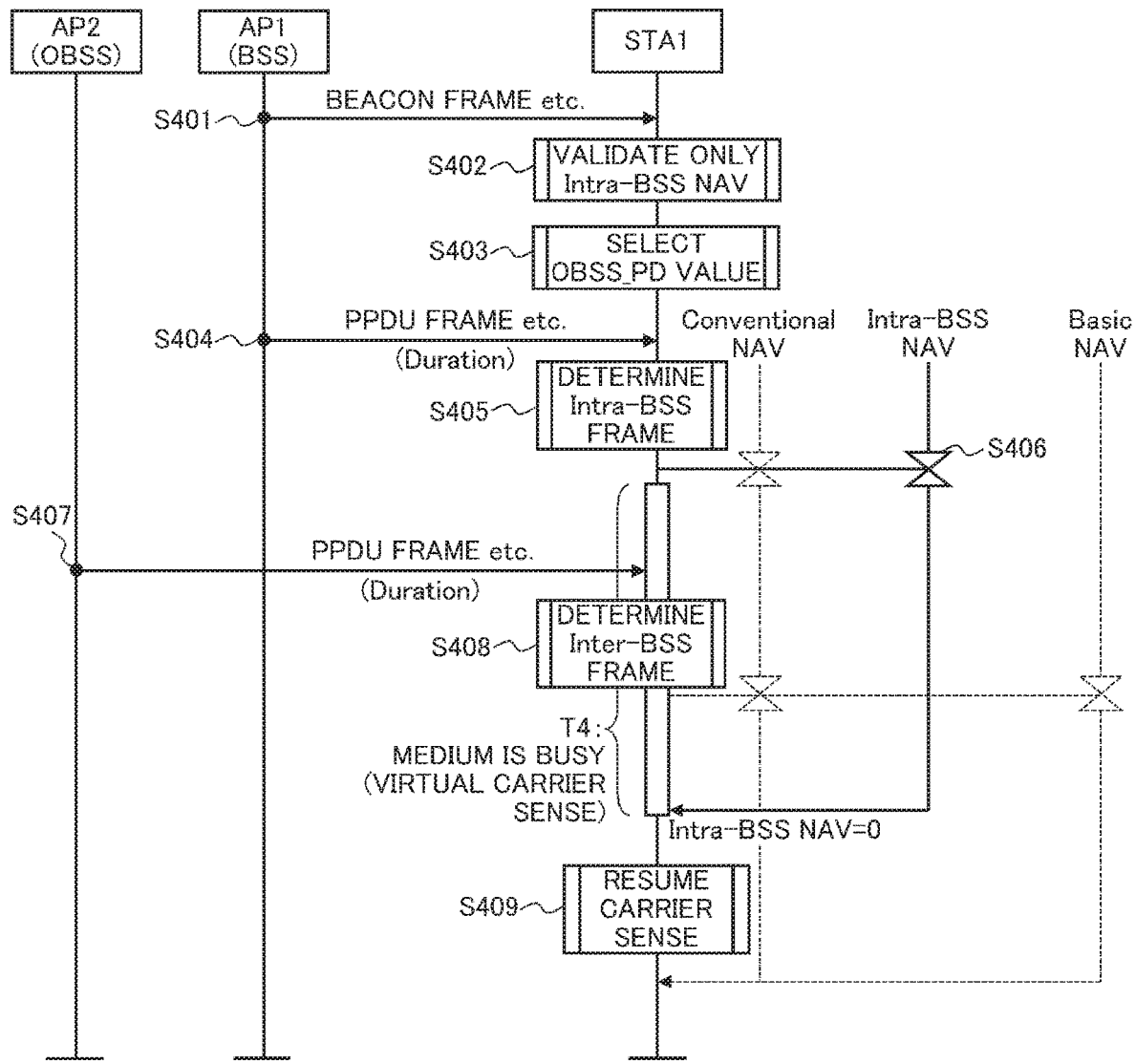
FIG. 5 is a sequence diagram for explaining a mode 4 in the wireless communication system according to a second example embodiment.

Next, a specific example for achieving the mode 4 is described with reference to FIG. 5.

First, the access point AP1 belonging to the BSS 1 transmits, to all the terminals STA1 compatible with the IEEE 802.11ax belonging to the BSS 1, signaling which instructs them to invalidate the Basic NAV and the Conventional NAV other than the Intra-BSS NAV (Step S401). The access point AP1 includes this signaling, for example, in a radio frame such as a beacon frame and transmits it.

When the terminal STA1 compatible with IEEE 802.11ax receives that signaling from the access point AP1, it invalidates the Basic NAV and the Conventional NAV other than the Intra-BSS NAV. Consequently, only the Intra-BSS NAV is validated (Step S402). After that, the terminal STA1 compatible with IEEE 802.11ax therefore uses only the Intra-BSS NAV to perform the virtual carrier sense. Further, the terminal STA1 compatible with IEEE 802.11ax randomly selects an OBSS_PD value for determining whether the received radio frame is an Intra-BSS frame or an Inter-BSS frame (Step S403). As for the OBSS_PD value, for example, a default value (e.g., OBSS_PDmin) or OBSS_PDmin notified in advance from the access point AP1 may be selected.

When the terminal STA1 compatible with IEEE 802.11ax receives a radio frame such as a PPDU frame and an RTS/CTS frame from the access point AP1 of the BSS 1 to which it belongs (Step S404), it determines whether the received radio frame is an Intra-BSS frame or an Inter-BSS frame, for example, by comparing a reception level of the received radio frame with the OBSS_PD value (Step S405).

Note that the radio frame received in Step S404 is an Intra-BSS frame and accordingly the terminal STA1 compatible with IEEE 802.11ax updates the Intra-BSS NAV based on the NAV value included in the Intra-BSS frame (Step S406). After that, in a period T4 in which the Intra-BSS NAV>0, the terminal STA1 compatible with IEEE 802.11ax does not perform physical carrier sense, considers the medium in use to be BUSY (virtual carrier sense), and does not transmit a radio frame.

Further, when the access point AP2 and the terminal STA2 compatible with the IEEE 802.11ax that belong to the BSS 2 serving as the OBSS have the OBSS_PD-based SR function properly, the event in which the terminal STA1 compatible with the IEEE 802.11ax receives a radio frame from the BSS 2 is less likely to occur. However, it is assumed here that the terminal STA1 compatible with IEEE 802.11ax accidentally receives a radio frame from the access point AP2 that belongs to the BSS 2 serving as the OBSS on the same medium as the above one (Step S407). In such a case, the terminal STA1 compatible with IEEE 802.11ax determines whether the received radio frame is an Intra-BSS frame or an Inter-BSS frame, for example, by comparing a reception level of the received radio frame with the OBSS_PD value (Step S408).

Note that the radio frame received in Step S407 is an Inter-BSS frame. However, the terminal STA1 compatible with IEEE 802.11ax invalidates the basic NAV and the Conventional NAV and accordingly does not update the value. Thus, it does not affect the virtual carrier sense.

Then, when the Intra-BSS NAV=0, the terminal STA1 compatible with IEEE 802.11ax resumes the physical carrier sense (Step S409).

According to the second example embodiment, as described above, the NAV which the terminal STA compatible with IEEE 802.11ax uses for the virtual carrier sense is switched, under the environment where settings of the OBSS_PD-based SR in the access point AP and the terminal STA compatible with IEEE 802.11ax that belong to a BSS is set to on, according to whether only the terminal STA compatible with IEEE 802.11ax is present as the terminal STA belonging to that BSS or both the terminal STA compatible with IEEE 802.11ax and the terminal STA incompatible with IEEE 802.11ax are present as the terminals STA belonging to that BSS.

This reduces the cases where the OBSS_PD-based SR and the Two NAVs are used in combination and thus makes it possible to prevent a behavior of the entire wireless communication system from being very complicated. Further, this simplifies the behavior of the entire wireless communication system and thus makes it possible to achieve a stable communication state.

For example, under the environment where settings of the OBSS_PD-based SR in the access point AP1 and the terminal STA1 compatible with IEEE 802.11ax that belong to the BSS 1 is set to on and where only the terminal STA1 compatible with IEEE 802.11ax is present as the terminal STA1, the mode 4 is performed. In the mode 4, the terminal STA1 compatible with IEEE 802.11ax uses only the Intra-BSS NAV to perform the virtual carrier sense. The terminal STA1 compatible with IEEE 802.11ax determines, upon receiving a radio frame including a NAV value, whether the received radio frame is an Intra-BSS frame received from the BSS 1 to which it belongs or an Inter-BSS frame received from the BSS 2 serving as the OBSS, and then updates the Intra-BSS NAV based on the NAV value included in the Intra-BSS frame only when determining the received radio frame to be the Intra-BSS frame.

If the terminal STA1 compatible with IEEE 802.11ax uses the Two NAVs under the environment where only the terminal STA1 compatible with IEEE 802.11ax is present as the terminal STA1 belonging to the BSS 1, there is a possibility that it may accidentally receive the NAV at a strong reception level from the BSS 2 serving as the OBSS and set the Basic NAV. However, when the OBSS_PD-based SR functions properly, the Intra-BSS communication within the BSS 2 performed during the transmission prohibited period set by that Basic NAV does not interfere with the Intra-BSS communication within the BSS 1. Consequently, when the Basic NAV prevents the Intra-BSS communication within the BSS 1 performed by the terminal STA1, the case where throughput and communication efficiency of the terminal STA1 deteriorate may occur. In the mode 4, the terminal STA1 compatible with IEEE 802.11ax does not use the Basic NAV and thus such a case can be prevented from occurring.

(3) Third Example Embodiment

IEEE 802.11ax (HEW) adds two mechanisms which are the OBSS_PD-based SR and the Two NAVs. In a wireless communication system, however, the setting of the OBSS_PD-based SR in the access point AP and the terminal STA compatible with IEEE 802.11ax is implementation-dependent. This causes a problem that a behavior of the entire wireless communication system cannot be predicted.

Hence, in a third example embodiment, the setting of the OBSS_PD-based SR in the access point AP and the terminal STA compatible with IEEE 802.11ax is adaptively turned on/off. Three operation examples in the third example embodiment are described hereinafter. Note that operations in the BSS 1 will be described hereinafter as examples and the same applies to operations in the BSS 2.

Operation Example 1

Figure 6:
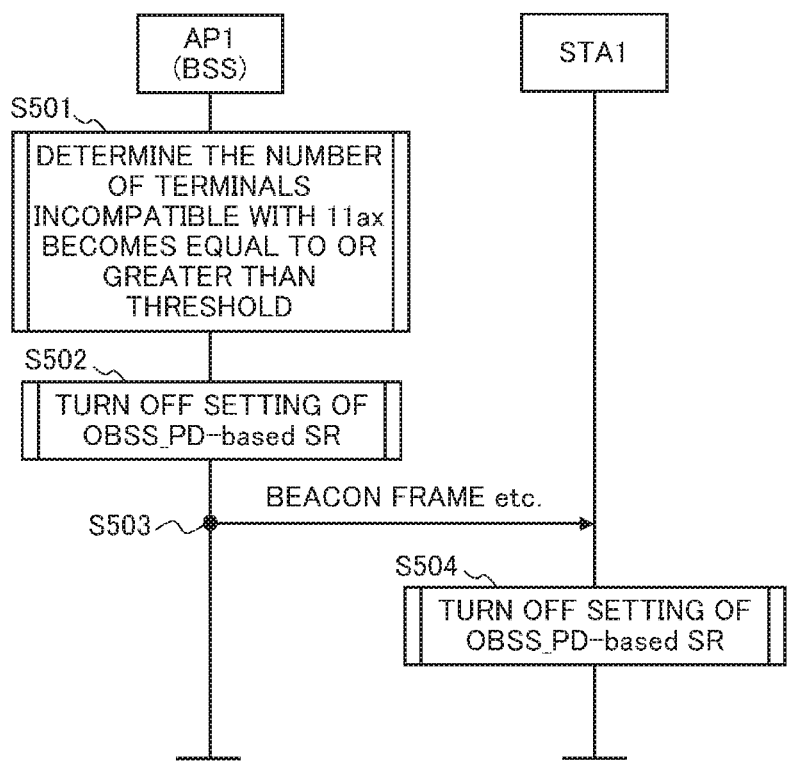
FIG. 6 is a sequence diagram for explaining an operation example 1 in the wireless communication system according to a third example embodiment.

First, an operation example 1 is described with reference to FIG. 6. The access point AP1 belonging to the BSS 1 recognizes the number of the terminals STA1 incompatible with the IEEE 802.11ax belonging to the BSS 1. It is assumed here that the access point AP1 has determined that the number of the terminals STA1 incompatible with IEEE 802.11ax has become equal to or greater than a predetermined threshold (Step S501).

Then, the access point AP1 turns off the setting of its own OBSS_PD-based SR (Step S502). Further, the access point AP1 transmits, to all the terminals STA1 compatible with IEEE 802.11ax belonging to the BSS 1, signaling which instructs them to turn off the setting of the OBSS_PD-based SR (Step S503). The access point AP1 includes this signaling, for example, in an HE operation element or a capability element of a radio frame such as a beacon frame and transmits it.

The terminal STA1 compatible with IEEE 802.11ax turns off the setting of its own OBSS_PD-based SR upon receiving the aforementioned signaling from the access point AP1 (Step S504).

Note that this operation example 1 may add the following operations when the number of the terminals STA1 incompatible with the IEEE 802.11ax belonging to the BSS 1 becomes equal to or greater than a predetermined threshold.

In Step S503, the access point AP1 transmits signaling which instructs the terminals to turn off the setting of the Two NAVs (in other words, to have the Two NAVs disabled. The same applies hereinafter.).

In Step S504, the terminal STA1 compatible with IEEE 802.11ax turns off the setting of its own Two NAVs.

The signaling in Step S503 may be a signal indicating, for example, that a BSS color bit is invalidated.

Operation Example 2

Figure 7:
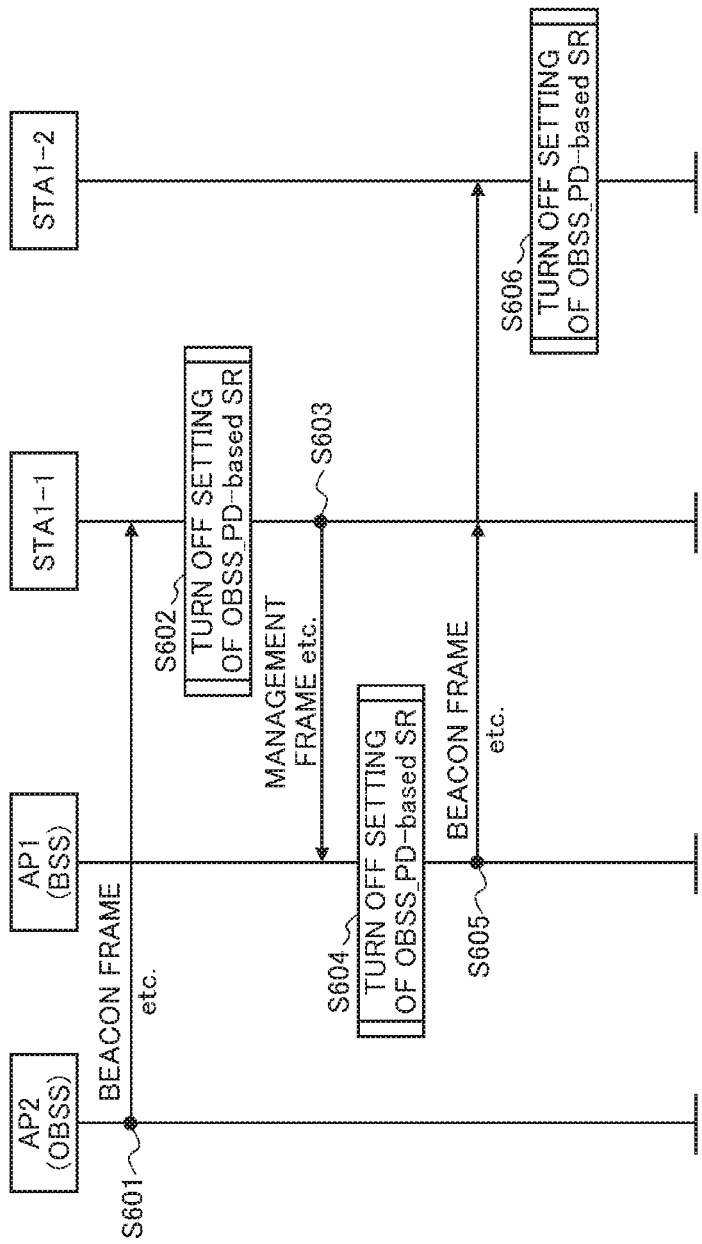
FIG. 7 is a sequence diagram for explaining an operation example 2 in the wireless communication system according to the third example embodiment.

Next, an operation example 2 is described with reference to FIG. 7. The explanation will be given assuming here that the only terminals STA1 belonging to the BSS 1 are the terminals STA1-1 and STA1-2 compatible with IEEE 802.11ax (see FIG. 1).

It is assumed that the terminal STA1-1 compatible with the IEEE 802.11ax belonging to the BSS 1 has detected a beacon frame or the like transmitted from the access point AP2 belonging to the BSS 2 which serves as the OBSS (Step S601). Further, it is assumed that the beacon frame or the like has included an instruction to turn off the setting of the OBSS_PD-based SR.

Then, similarly, the terminal STA1-1 compatible with the IEEE 802.11ax turns off the setting of its own OBSS_PD-based SR (Step S602). Further, the terminal STA1-1 compatible with IEEE 802.11ax transmits, to the access point AP1 belonging to the BSS 1, signaling (first signaling) which notifies the access point AP1 of the setting of its own OBSS_PD-based SR (Step S603). The terminal STA1-1 compatible with IEEE 802.11ax includes this signaling, for example, in an HE operation element or a capability element of the radio frame such as a management frame and transmits it.

The access point AP1 turns off the setting of its own OBSS_PD-based SR in the same manner as that of the terminal STA1-1 compatible with IEEE 802.11ax upon receiving the aforementioned signaling from the terminal STA1-1 (Step S604). Further, the access point AP1 transmits, to all the terminals STA1-1 and STA1-2 compatible with IEEE 802.11ax belonging to the BSS 1, signaling (second signaling) which instructs them to turn off the setting of the OBSS_PD-based SR in the same manner as that of the terminal STA1-1 (Step S605). The access point AP1 includes this signaling, for example, in an HE operation element or a capability element of the radio frame such as a beacon frame and transmits it.

The terminal STA1-2 compatible with IEEE 802.11ax turns off the setting of its own OBSS_PD-based SR in the same manner as that of the terminal STA1-1 upon receiving the aforementioned signaling from the access point AP1 (Step S606). Note that the terminal STA1-1 compatible with the IEEE 802.11ax has already turned off its own setting of the OBSS_PD-based SR at the time of Step S602 and maintains this setting.

Note that this operation example 2 may add the following operations when the beacon frame or the like, which the terminal STA1-1 compatible with the IEEE 802.11ax has received from the access point AP2, includes an instruction to turn off (invalidate) the setting of the Two NAVs (the Intra-BSS NAV and the Basic NAV).

In Step S602, the terminal STA1-1 compatible with the IEEE 802.11ax turns off the setting of its own Two NAVs.

In Step S603, the terminal STA1-1 compatible with the IEEE 802.11ax transmits signaling which notifies the access point AP1 of the setting of its own Two NAVs.

In Step S605, the access point AP1 transmits signaling which instructs the terminals to turn off the setting of the Two NAVs.

In Step S606, the terminal STA1-2 compatible with the IEEE 802.11ax turns off the setting of its own Two NAVs.

Further, on the contrary, this operation example 2 may add the following operations when the beacon frame or the like, which the terminal STA1-1 compatible with the IEEE 802.11ax has received from the access point AP2, includes an instruction to turn on the setting of the Two NAVs (the Intra-BSS NAV and the Basic NAV) (in other words, the Two NAVs are enabled. The same applies hereinafter.).

In Step S602, the terminal STA1-1 compatible with the IEEE 802.11ax turns on the setting of its own Two NAVs.

In Step S603, the terminal STA1-1 compatible with the IEEE 802.11ax transmits signaling which notifies the access point AP1 of the setting of its own Two NAVs.

In Step S605, the access point AP1 transmits signaling which instructs the terminals to turn on the setting of the Two NAVs.

In Step S606, the terminal STA1-2 compatible with the IEEE 802.11ax turns on the setting of its own Two NAVs.

Operation Example 3

Figure 8:
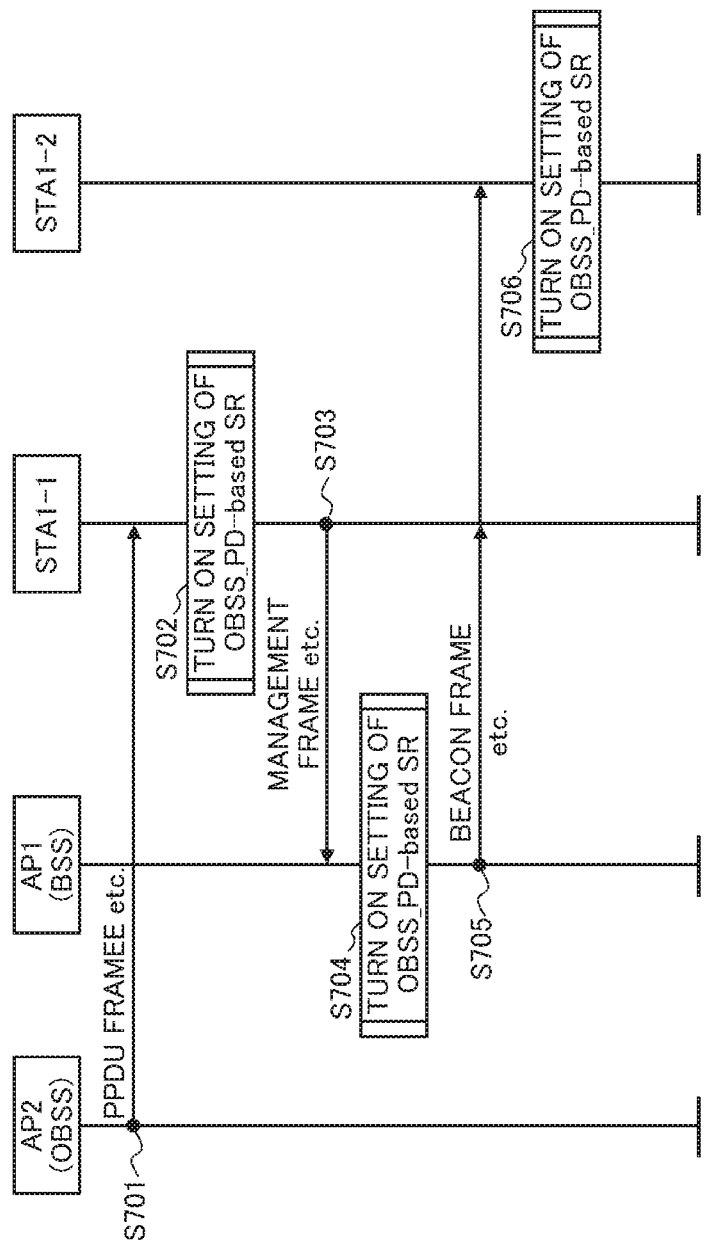
FIG. 8 is a sequence diagram for explaining an operation example 3 in the wireless communication system according to the third example embodiment.

Next, an operation example 3 is described with reference to FIG. 8. The explanation will be given assuming here that the only terminals STA1 belonging to the BSS 1 are the terminals STA1-1 and STA1-2 compatible with IEEE 802.11ax (see FIG. 1).

It is assumed that the terminal STA1-1 compatible with the IEEE 802.11ax belonging to the BSS 1 has detected a PPDU frame or the like transmitted from the access point AP2 belonging to the BSS 2 which serves as the OBSS (Step S701).

Then, the terminal STA1-1 compatible with the IEEE 802.11ax turns on the setting of its own OBSS_PD-based SR (Step S702). Further, the terminal STA1-1 compatible with IEEE 802.11ax transmits, to the access point AP1 belonging to the BSS 1, signaling (first signaling) which notifies the access point AP1 of the setting of its own OBSS_PD-based SR (Step S703). The terminal STA1-1 compatible with IEEE 802.11ax includes this signaling, for example, in an HE operation element or a capability element of a radio frame such as a management frame and transmits it.

The access point AP1 turns on the setting of its own OBSS_PD-based SR in the same manner as that of the terminal STA1-1 compatible with IEEE 802.11ax upon receiving the aforementioned signaling from the terminal STA1-1 (Step S704). Further, the access point AP1 transmits, to all the terminals STA1-1 and STA1-2 compatible with IEEE 802.11ax belonging to the BSS 1, signaling (second signaling) which instructs them to turn on the setting of the OBSS_PD-based SR in the same manner as that of the terminal STA1-1 (Step S705). The access point AP1 includes this signaling, for example, in an HE operation element or a capability element of a radio frame such as a beacon frame and transmits it.

The terminal STA1-2 compatible with IEEE 802.11ax turns on the setting of its own OBSS_PD-based SR in the same manner as that of the terminal STA1-1 upon receiving the aforementioned signaling from the access point AP1 (Step S706). Note that the terminal STA1-1 compatible with the IEEE 802.11ax has already turned on the setting of its own OBSS_PD-based SR at the time of Step S702 and maintains this setting.

Note that this operation example 3 may add the following operations when the terminal STA1-1 compatible with the IEEE 802.11ax has received the PPDU frame or the like from the access point AP2. In Step S702, the terminal STA1-1 compatible with the IEEE 802.11ax turns on the setting of its own Two NAVs.

In Step S703, the terminal STA1-1 compatible with the IEEE 802.11ax transmits signaling which notifies the access point AP1 of the setting of its own Two NAVs.

In Step S705, the access point AP1 transmits signaling which instructs the terminals to turn on the setting of the Two NAVs.

In Step S706, the terminal STA1-2 compatible with the IEEE 802.11ax turns on the setting of its own Two NAVs.

Further, the following operations may be added instead of the aforementioned operations.

In Step S702, the terminal STA1-1 compatible with the IEEE 802.11ax turns off the setting of its own Two NAVs.

In Step S703, the terminal STA1-1 compatible with the IEEE 802.11ax transmits signaling which notifies the access point AP1 of the setting of its own Two NAVs.

In Step S705, the access point AP1 transmits signaling which instructs the terminals to turn off the setting of the Two NAVs.

In Step S706, the terminal STA1-2 compatible with the IEEE 802.11ax turns off the setting of its own Two NAVs.

According to the third example embodiment, as described above, the access point AP and the terminal STA compatible with IEEE 802.11ax that belong to the BSS adaptively turn on/off the setting of the OBSS_PD-based SR.

This makes it possible to recognize a setting state of the OBSS_PD-based SR in the access point AP and the terminal STA compatible with IEEE 802.11ax, and thus makes it easier to predict a behavior of the entire wireless communication system.

Hereinafter, a configuration example of the access point AP and the terminal STA in a certain aspect, which has been described in the above-described first to third example embodiments, is described.

Figure 9:
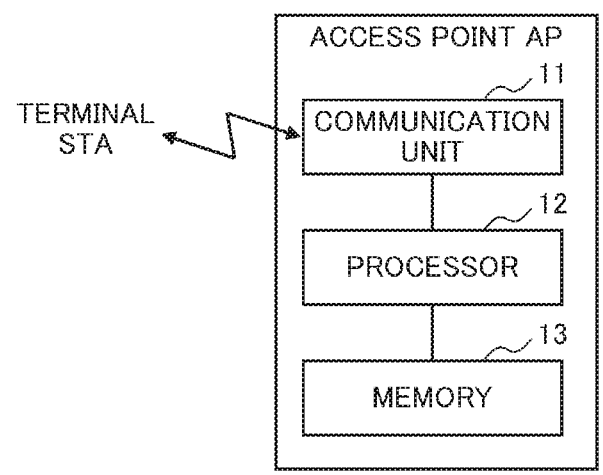
FIG. 9 is a block diagram showing a configuration example of an access point in a certain aspect.

FIG. 9 is a block diagram showing a configuration example of the access point AP in a certain aspect. The access point AP includes a communication unit 11, a processor 12, and a memory 13. The communication unit 11 is configured to perform wireless communication with the terminals STA within the BSS to which it belongs and is connected to the processor 12.

The memory 13 is configured to store an instruction set for performing processing of the access point AP described in the above-described example embodiments and software modules (computer programs) including data. The memory 13 may be composed of, for example, a combination of a volatile memory and a non-volatile memory.

The processor 12 is configured to read the software module (computer program) from the memory 13 and execute the software module to perform processing of the access point AP described in the above embodiments. The processor 12 may be, for example, a microprocessor, a Micro Processing Unit (MPU) or a Central Processing Unit (CPU). The processor 12 may include a plurality of processors.

Figure 10:
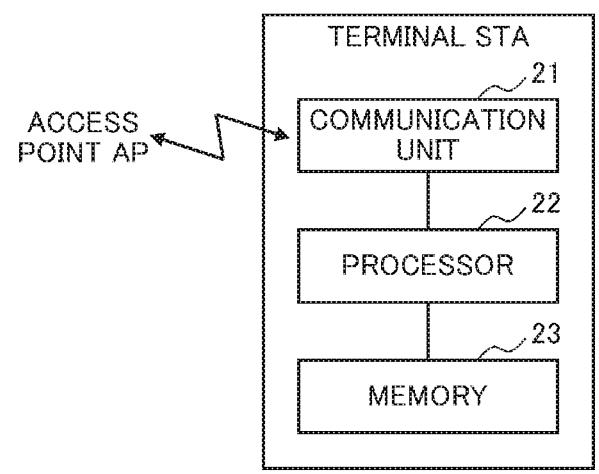
FIG. 10 is a block diagram showing a configuration example of a terminal in a certain aspect.

FIG. 10 is a block diagram showing a configuration example of the terminal STA in a certain aspect. The terminal STA includes a communication unit 21, a processor 22, and a memory 23. The communication unit 21 is configured to perform wireless communication with the access point AP within the BSS to which it belongs and is connected to the processor 22.

The memory 23 is configured to store an instruction set for performing processing of the terminal STA described in the above-described example embodiments and software modules (computer programs) including data. The memory 23 may be composed of, for example, a combination of a volatile memory and a non-volatile memory.

The processor 22 is configured to read the software module (computer program) from the memory 23 and execute the software module to perform processing of the terminal STA described in the described example embodiments. The processor 22 may be, for example, a microprocessor, an MPU or a CPU. The processor 22 may include a plurality of processors.

The above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various aspects of the present invention have been described with reference to the example embodiments above. However, the present invention is not limited to the above. Various changes that can be understood by those skilled in the art can be made to the configuration and the details of each aspect of the present invention without departing from the scope of the invention. For example, the whole or part of the above first, second and third example embodiments may be mutually combined and used.

The invention claimed is:

1. A wireless communication system comprising:
    an access point (AP) that belongs to a Basic Service Set (BSS); and
    a terminal (STA) that belongs to the AP, wherein
    the AP is configured to instruct the STA to set a settings associated with Overlapping BSS (OBSS) Power Detect (PD)-based Spatial Reuse (SR) that includes a function of performing adjustment so as to avoid interference between the BSS and the OBSS to on, and
    the STA is configured to:
    receive an inter-BSS frame and, based on the setting, not update a Basic Network Allocation Vector (NAV) used for virtual carrier sense; and
    receive an intra-BSS frame and, based on the intra-BSS frame, update an intra-BSS NAV used for virtual carrier sense.

2. An access point (AP), wherein the AP is operable to perform an Overlapping Basic Service Set (BSS) Power Detect (PD)-based Spatial Reuse (SR) that includes a function of performing adjustment so as to avoid interference between a BSS including the AP and a STA and an Overlapping BSS (OBSS) which is overlapped to the BSS, the AP comprising:
    a memory configured to store instructions; and
    at least one processor configured to process the instructions to:
    instruct the STA to set a settings associated with the OBSS_PD-based SR to on to cause the STA to not update a Basic Network Allocation Vector (NAV) used for virtual carrier sense based on the setting in a case where the STA receives an inter-BSS frame, and cause the STA to update an intra-BSS NAV used for virtual carrier sense based on an intra-BSS frame in a case where the STA receives the intra-BSS frame.

3. A terminal (STA) in a wireless communication system, the wireless communication system including an access point (AP) that belongs to a Basic Service Set (BSS) and the STA that belongs to the AP, the STA comprising:
a memory configured to store instructions; and
at least one processor configured to process the instructions to:
receive an inter-BSS frame and, based on a settings which is set to on, wherein the setting is associated with Overlapping BSS (OBSS) Power Detect (PD)-based Spatial Reuse (SR) that includes a function of performing adjustment so as to avoid interference between the BSS and an OBSS which is overlapped to the BSS, not update a Basic Network Allocation Vector (NAV) used for virtual carrier sense; and
receive an intra-BSS frame and, based on the intra-BSS frame, update an intra-BSS NAV used for virtual carrier sense.

4. The STA according to claim 3, wherein the at least one processor is further configured to process the instructions to perform the virtual carrier sense by using the intra-BSS NAV.

5. A communication method performed by an access point (AP), wherein the AP is operable to perform an Overlapping Basic Service Set (BSS) Power Detect (PD)-based Spatial Reuse (SR) that includes a function of performing adjustment so as to avoid interference between a BSS including the AP and a STA and an Overlapping BSS (OBSS) which is overlapped to the BSS, the communication method comprising:
instructing the STA to set a settings associated with the OBSS_PD-based SR to on to cause the STA to not update a Basic Network Allocation Vector (NAV) used for virtual carrier sense based on the settings in a case where the STA receives an inter-BSS frame, and cause the STA to update an intra-BSS NAV used for virtual carrier sense based on an intra-BSS frame in a case where the STA receives the intra-BSS frame.

6. A communication method performed by a terminal (STA), the communication method comprising:
receiving an inter-BSS frame and, based on a settings which is set to on, wherein the setting is associated with Overlapping BSS (OBSS) Power Detect (PD)-based Spatial Reuse (SR) that includes a function of performing adjustment so as to avoid interference between the BSS and an OBSS which is overlapped to the BSS, not updating a Basic Network Allocation Vector (NAV) used for virtual carrier sense; and
receiving an intra-BSS frame and, based on the intra-BSS frame, updating an intra-BSS NAV used for virtual carrier sense.

* * * * *

UNITED STATES PATENT AND TRADEMARK OFFICE
CERTIFICATE OF CORRECTION

PATENT NO. : 10,939,465 B2  
APPLICATION NO. : 16/477568  
DATED : March 2, 2021  
INVENTOR(S) : Leonardo Lanante et al.

Page 1 of 1

It is certified that error appears in the above-identified patent and that said Letters Patent is hereby corrected as shown below:

In the Claims

Column 18, Line 45, Claim 1, please replace "the OBSS" with --- an OBSS ---.

Column 18, Line 47, Claim 1, please replace "setting" with --- settings ---.

Column 18, Line 66, Claim 2, please replace "setting" with --- settings ---.

Column 19, Line 12, Claim 3, please replace "setting" with --- settings ---.

Column 20, Line 17, Claim 6, please replace "setting" with --- settings ---.

Column 20, Line 20, Claim 6, please replace "the" with --- a ---.

Signed and Sealed this  
Thirty-first Day of May, 2022

Katherine Kelly Vidal  
*Director of the United States Patent and Trademark Office*